Oct. 6, 1936.     W. E. BELINE     2,056,818
ABSORBER MECHANISM
Filed Oct. 4, 1934     2 Sheets-Sheet 1

Inventor
Walter E. Beline
by [signature]
Attorney

Oct. 6, 1936.  W. E. BELINE  2,056,818
ABSORBER MECHANISM
Filed Oct. 4, 1934  2 Sheets-Sheet 2
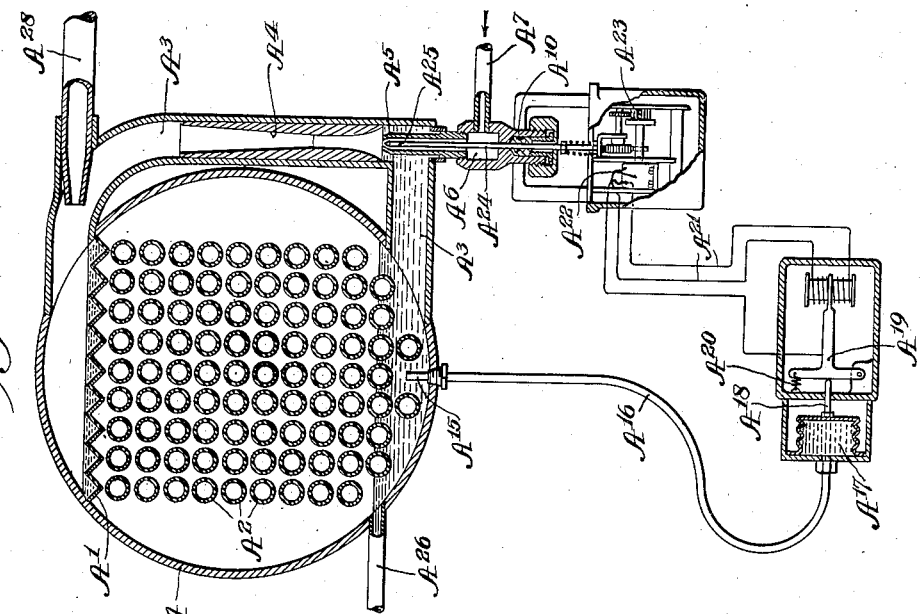
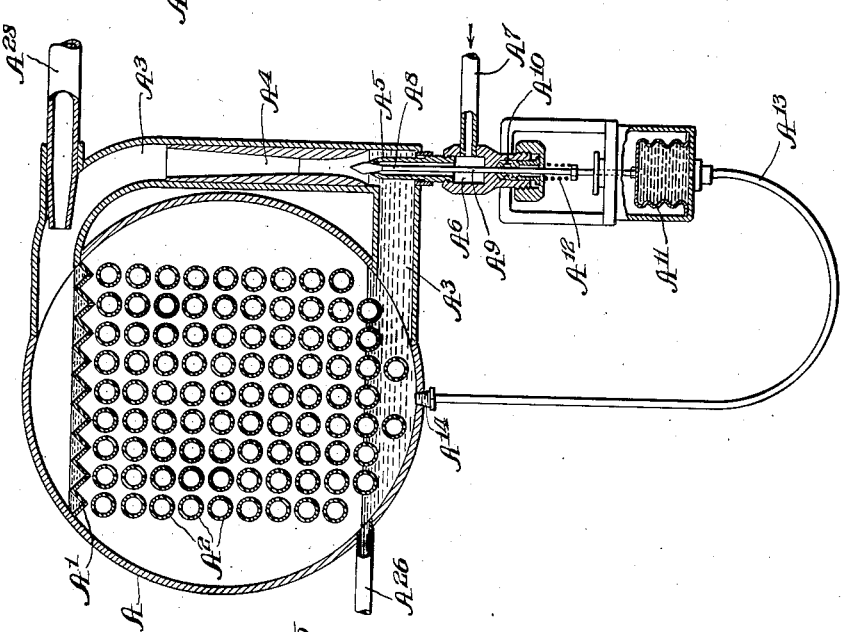
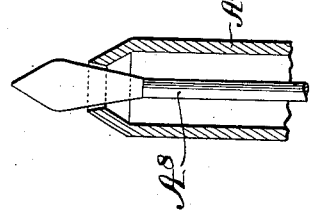
Inventor
Walter E. Beline
by
Attorney.

Patented Oct. 6, 1936

2,056,818

UNITED STATES PATENT OFFICE 2,056,818

ABSORBER MECHANISM

Walter E. Beline, Pottsville, Pa., assignor to The Philadelphia and Reading Coal and Iron Company, Philadelphia, Pa., a corporation of Pennsylvania Application October 4, 1934, Serial No. 746,768

7 Claims. (Cl. 62—119)

My invention relates to absorber mechanism by means of which a gaseous or vaporous fluid is taken into solution in a liquid absorbent and the more or less saturated absorbent delivered from the absorber for further processing and particularly to the incorporation of my improved absorber apparatus in refrigerating apparatus.

As heretofore constructed, absorbers have been used both of the dry and flooded type and provision has been made for the recirculation of the absorbent liquid through the absorber and for a more or less regulated delivery of weak or unsaturated absorbent liquid to the absorber and for the feeding to the absorber of the gas or vapor which it is desired to bring into solution in the absorbent liquid.

The object of my invention is, in absorbers in which the absorbent liquor is delivered to the absorber under pressure, to, in the first place, control the quantity of the weak liquor delivered to the absorber by a valve automatically actuated by mechanism controlled by changing conditions occurring in the absorber or intimately connected parts of an apparatus so that, for example, an increase of pressure or temperature in the absorber will bring about an increased delivery of the weak liquor to the absorber in order to reduce this pressure or temperature to a predetermined point. Another object of my invention is, in an apparatus in which the inflow of the weak liquor is utilized to bring about a recirculation of the liquid contents of the absorber by acting as an impelling jet, forming with a combining tube forming part of a recirculating conduit, an ejector, to provide for the maximum efficiency of the ejector under varying rates of flow of the weak liquor by providing as a means for regulating the inflow of the weak liquor an adjustable needle valve located in and regulating the exit orifice area of the jet nozzle so as to insure that in all adjustments the weak liquor will issue from the nozzle with a maximum velocity and efficiency thereby insuring that in all adjustments of the valve the ejector will function with high efficiency and bring about a maximum recirculation of the liquid in the absorber. A third object of my invention is, in an apparatus in which weak liquor under pressure is utilized in a valve controlled ejector to bring about an energetic recirculation of the liquid contents of the absorber, to bring about an inflow of the gas or vapor to be absorbed by feeding the gas to the absorber in the upper portion of the recirculating pipe through which the mixed weak and strong liquor enters the absorber, thus insuring that the gas shall be brought in intimate contact with the mixture of strong and weak absorbent before the absorbent liquid is delivered into the absorber, and my invention consists in the combination with an absorber and, more particularly, though not exclusively, with an absorber used in connection with a refrigerating apparatus, of the various devices and combinations for effecting the above stated objects of my invention, hereinafter more particularly described and specifically referred to in my claims.

My invention will be better understood as described in connection with the drawings forming part of this specification in which my improved absorber is illustrated as a part of a refrigerating system and in which Figure 1 is a diagrammatic elevation of a refrigerating system with parts of the different elements constituting the system broken away and sectioned to indicate the internal construction of such elements.

Figure 2 is a transverse section taken through the absorber on the line 2—2 of Fig. 1, and shown on a larger scale and indicating a mechanical control for the needle valve which controls the admission of weak liquor to the absorber.

Figure 3 is a view similar to Fig. 2, showing a different control device for adjusting the needle valve, and Figure 4 is an enlarged sectional view illustrating the construction of the ejector nozzle and the needle valve controlling the orifice through which the weak liquor is delivered.

Figure 1:
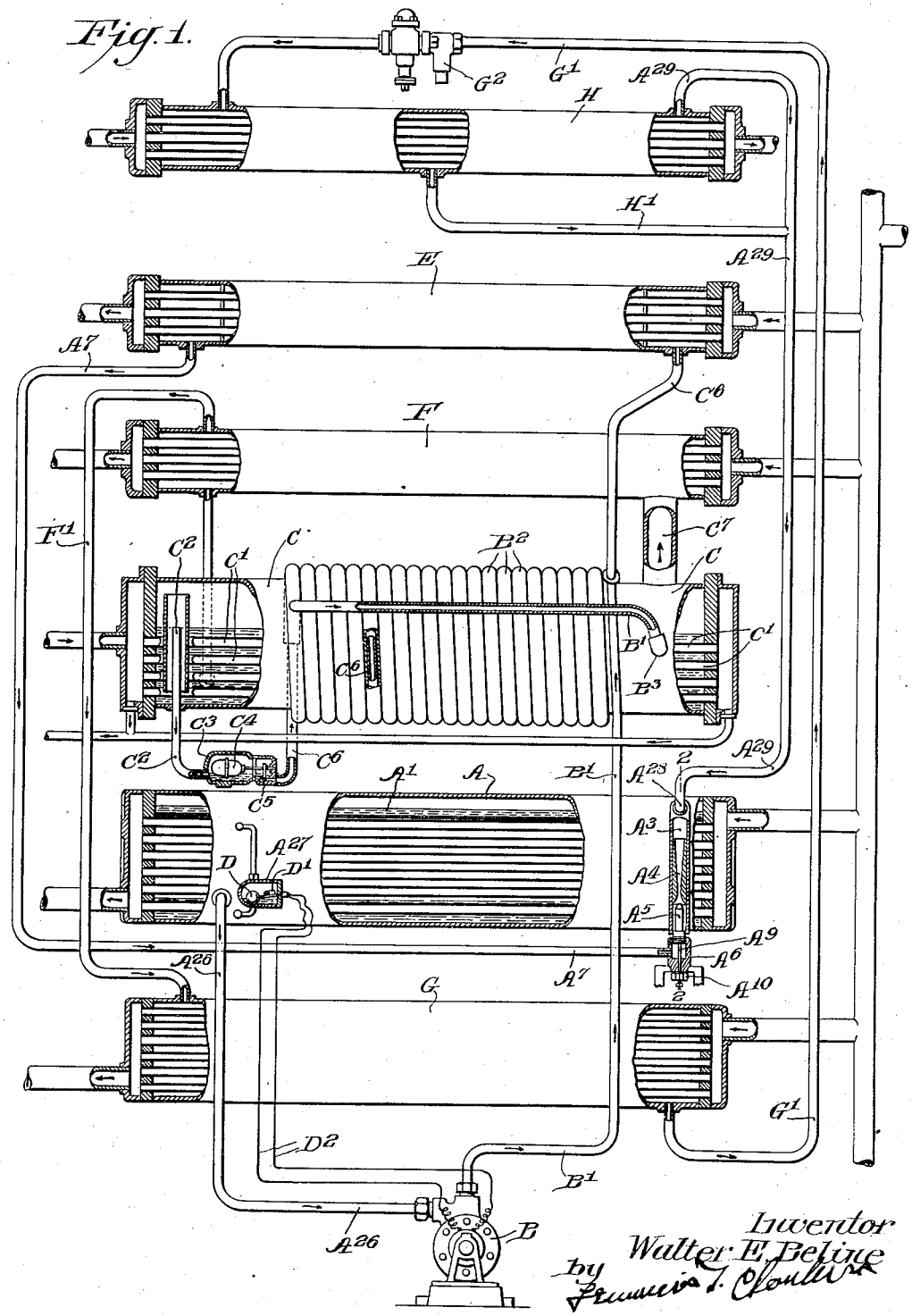

A is the absorber which, as shown, is of the dry type. Extending across the upper portion of the absorber is a corrugated and perforated tray $A^1$, below which tray are located the cooling pipes $A^2$. The bottom and top of the absorber are connected to a recirculating and feed pipe $A^3$, and in this pipe is located a combining tube which is indicated at $A^4$. Located in the proper position with regard to the combining tube is an ejector nozzle indicated at $A^5$, which is connected to a chamber $A^6$ which, in turn, is connected to a weak liquor conduit $A^7$, connected in turn to a portion of the generator in which weak liquor accumulates. Operatively located in the nozzle $A^5$ is a needle valve indicated at $A^8$ which is adjusted by means of a spindle $A^9$, which extends through a stuffing box indicated at $A^{10}$ and which, preferably, as shown, is actuated to adjust the valve by mechanism in turn actuated by changes in condition, such as temperature or pressure, occurring in the absorber or an intimately connected part. As shown in Fig. 2, the stem $A^9$ is connected to an expansible bellows indicated at $A^{11}$ and normally compressed by a spring $A^{12}$. This bellows is connected by a pipe $A^{13}$ opening into the bottom of the absorber, as indicated at $A^{14}$, so that with increasing pressure in the absorber the bellows is correspondingly expanded and in turn effects the adjustment of the needle valve in the nozzle. In the modification of the construction illustrated in Fig. 3, the device indicated for effecting the adjustment of the needle valve is one actuated by changes of temperature in the absorber. As shown, a thermal element, indicated at $A^{15}$ as a closed pipe extending into the absorber, is connected by a pipe $A^{16}$ with an expansible bellows, indicated at $A^{17}$, which bellows is connected, as indicated at $A^{18}$, with an electric switch arm, indicated at $A^{19}$, normally held in neutral position by a spring $A^{20}$. This switch arm controls an electric circuit, indicated at $A^{21}$, which in turn actuates a motor $A^{22}$, wired to operate in either direction, and, through a gear train, indicated at $A^{23}$, coupled to actuate the valve spindle $A^{24}$, connected to actuate the needle valve in the weak liquor nozzle, here indicated at $A^{25}$. $A^{26}$ is an outlet conduit leading from the absorber at about the level at which the liquid content of the absorber is maintained. $A^{27}$ is a float chamber connected to the absorber above and below the liquid level maintained therein and $A^{28}$ is a nozzle located in the upper portion of the return conduit $A^3$ at some distance from its delivery end and connected by a pipe $A^{29}$ to a source of the gas or vapor to be absorbed in the absorbent liquor contained in the absorber.

As shown, the outlet pipe $A^{26}$ connects with a pump B, shown as an electrically actuated pump which, in turn, is connected by a pipe $B^1$ with a generator C. As shown, this heat exchanger pipe $B^1$ is coiled around the generator as indicated at $B^2$ and the strong working fluid after passing through these exchanger coils is delivered to the generator at $B^3$.

As shown, the operation of the pump B is controlled by a float D, located within the chamber $A^{27}$, the arm of which carries a mercury switch indicated at $D^1$, which opens and closes the circuit $D^2$, leading to the pump B. The generator C is provided with steam heating pipes as indicated at $C^1$ and has a weak liquor outlet pipe $C^2$, from which the liquid content of the generator passes to a float chamber $C^3$, in which is located a float $C^4$, which controls a valve $C^5$, to close the outlet opening of the float chamber if the weak liquor level in the generator falls low to prevent gas flow. The weak liquor leaving the float chamber passes through a pipe $C^6$ which, as shown, passes through the heat exchanger coils $B^2$ and outward therefrom to a cooler indicated at E, from which in turn it passes through the pipe $A^7$ to the chamber $A^6$ and the ejector nozzle $A^5$.

The refrigerant gas, ammonia, for example, driven off from the working fluid in the generator passes from the generator through a passage $C^7$ to a rectifier, indicated at F, and thence through a pipe $F^1$ to a condenser, indicated at G, and the condensed refrigerant passes from the condenser through a pipe $G^1$ and a pressure or other type regulating valve $G^2$ into the evaporator H, wherein the refrigerant is again vaporized by the absorption of heat and passes through the conduit $A^{29}$ to the nozzle $A^{28}$ in the recirculating pipe $A^3$. At $H^1$ I have indicated a purge line leading to the gas or vapor conduit $A^{29}$. It will be understood that, apart from special details of construction used in connection with the absorber, the apparatus described is of the familiar absorption refrigerating machine type and while my improvements are especially intended and adapted for use in connection with such an apparatus, they are also of value in connection with absorbents used in other constructions and applications.

In operation, the absorber being charged with a working fluid, the strong working fluid, when the float D is actuated by the rising level of the fluid in the absorber, actuates the switch $D^1$ and closes the circuit $D^2$, bringing the pump B into operation. Working fluid is then drawn from the absorber through the conduit $A^{26}$ and delivered by the pump through the conduit $B^1$ to the generator, wherein it is heated to drive off the absorbed refrigerant gas or vapor which passes from the generator to the rectifier F and thence through the pipe $F^1$ to the condenser G, from which the condensed refrigerant passes through the pipe $G^1$ and valve $G^2$ to the evaporator H, where the liquid refrigerant is vaporized, and passes through the pipe $A^{29}$ to the nozzle $A^{28}$, from which it issues into the combined stream of weak and strong absorbent, where, to a large extent, it is absorbed before delivery into the upper part of the absorber. The weak liquor or absorbent issuing from the generator, after passing the weak absorbent trap $C^5$, passes through the pipe $C^6$ which, passing through the heat exchanger coil $B^2$, is cooled before it enters the cooler E for further cooling. The weak liquor passes on through conduit $A^7$. It then is delivered from the ejector nozzle $A^5$ with high velocity and efficiency in connection with the combining tube $A^4$ which will cause a recirculation through the conduit $A^3$ of several times the amount of strong working fluid to that of the weak fluid issuing through the ejector nozzle so that the combined fluid fed to the top of the absorber may be an amount as much as eight or even more times the amount of weak fluid entering the recirculating pipe through the ejector nozzle.

While the amount of weak liquor delivered to the ejector nozzle may, of course, be regulated in various ways, this is most effectively accomplished by locating a needle valve, such as $A^8$ or $A^{25}$, in the end of the nozzle $A^5$ because by such a construction the weak liquor issues from the nozzle under full pressure, irrespective of the adjustment of the needle valve and is, therefore, more effective.

While the needle valve may be adjusted in any convenient way, it is highly desirable that its adjustments should be made automatic and depending on varying conditions from time to time existing in the absorber or parts intimately connected therewith, such as the evaporator. Thus, as shown and described in connection with Fig. 2, the adjustment may be effected by changing pressures in the absorber or, as shown and described in connection with Fig. 3, with changing temperatures in the absorber.

Having now described my invention, what I claim as new and desire to secure by Letters Patent, is:

1. Gas absorber mechanism comprising a chamber for absorbent liquid provided with a recirculating pipe connecting the top and bottom of the chamber the lower end of said recirculating pipe being connected to receive liquid from the bottom of the absorber chamber and its upper end connected to deliver liquid to the top of the absorber chamber, said recirculating pipe incorporating a combining tube located in said recirculating pipe at a proper level with regard to the liquid level maintained in the absorber, a conduit for unsaturated absorbent liquid under pressure having a terminal nozzle located in the combining tube and forming therewith an ejector operative to force the liquid content of the recirculating pipe into the top of the absorber chamber, an adjustable regulating needle valve located in the nozzle, means for adjusting said valve in the nozzle, means for progressively drawing off gas saturated absorbent liquor from the absorber chamber and means for supplying the absorber with gaseous fluid.

2. Absorber mechanism as called for in claim 1, having located in the upper portion of the recirculating pipe a nozzle through which the gaseous fluid enters the apparatus.

3. Absorber mechanism as called for in claim 1, in which the adjustment of the needle valve located in the nozzle is automatically effected by mechanism actuated by changing conditions in the absorber.

4. In a refrigerating apparatus of the absorption type comprising an absorber, a generator, means for feeding strong working fluid from the absorber to the generator, a condenser, an evaporator and means for conveying the vaporized refrigerant to the absorber, the improved construction comprising a recirculating pipe connecting the top and bottom of the absorber, the lower end of said recirculating pipe being connected to receive liquid from the bottom of the absorber chamber and its upper end connected to deliver liquid to the top of the absorber chamber, having incorporated in it a combining tube, an upwardly directed ejector nozzle located in said combining tube adapted in combination with the combining tube to force the liquid content of the recirculating pipe into the top of the absorber chamber, said nozzle having an adjustable regulating needle valve located at or adjacent to its outlet and a weak liquor conduit connecting said nozzle to the generator.

5. Apparatus as called for in claim 4, in which the vapor conduit leading from the evaporator terminates in a nozzle located in the upper part of the recirculating conduit of the absorber located at some distance in advance of the delivery end of said conduit.

6. Apparatus as called for in claim 4, provided with means for automatically adjusting the valve in the nozzle through which the weak liquor enters the recirculating pipe of the absorber actuated by varying conditions occurring in that section of the circulatory system comprising the absorber and the evaporator.

7. In a refrigerating apparatus of the absorption type comprising an absorber, a generator, means for feeding strong working fluid from the absorber to the generator, a condenser, an evaporator and means for conveying the vaporized refrigerant to the absorber, the improved construction comprising a recirculating pipe connecting the top and bottom of the absorber having incorporated in it a combining tube, an ejector nozzle located in said combining tube and directed to cause an upward circulation of liquid in the recirculating pipe, a weak liquor supply pipe connecting said nozzle to the generator, an adjustable valve located in the weak liquor supply pipe for adjusting the flow therethrough and automatic valve adjusting mechanism actuated by varying conditions of pressure and temperature occurring in that section of the circulatory system comprising the absorber and the evaporator.

WALTER E. BELINE.